US012009855B2

(12) United States Patent
Kitahara et al.

(10) Patent No.: US 12,009,855 B2
(45) Date of Patent: Jun. 11, 2024

(54) MONITORING SYSTEM, MONITORING DEVICE, AND MONITORING METHOD

(71) Applicant: NEC Corporation, Tokyo (JP)

(72) Inventors: Yoshinori Kitahara, Tokyo (JP); Yoshiaki Aono, Tokyo (JP); Yuusuke Sakurai, Tokyo (JP); Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/799,378

(22) PCT Filed: Mar. 4, 2020

(86) PCT No.: PCT/JP2020/009053
§ 371 (c)(1),
(2) Date: Aug. 12, 2022

(87) PCT Pub. No.: WO2021/176581
PCT Pub. Date: Sep. 10, 2021

(65) Prior Publication Data
US 2023/0061220 A1    Mar. 2, 2023

(51) Int. Cl.
*H04B 10/08* (2006.01)
*G01H 9/00* (2006.01)
*H04B 10/079* (2013.01)

(52) U.S. Cl.
CPC ......... *H04B 10/0791* (2013.01); *G01H 9/004* (2013.01)

(58) Field of Classification Search
CPC ............ H04B 10/0791; H04B 10/0795; H04B 10/0771; H04B 10/0793; H04B 10/071;
(Continued)

(56) References Cited

U.S. PATENT DOCUMENTS 11,561,118 B2* 1/2023 Yoda ................. G01D 5/35338
2019/0025095 A1* 1/2019 Steel ................. G01D 5/35358
(Continued)

FOREIGN PATENT DOCUMENTS

JP    2002-152937 A    5/2002
JP    2009-037438 A    2/2009
(Continued)

OTHER PUBLICATIONS

International Search Report for PCT Application No. PCT/JP2020/009053, dated Mar. 31, 2020.

*Primary Examiner* — Hanh Phan
(74) *Attorney, Agent, or Firm* — Sughrue Mion, PLLC

(57) ABSTRACT

A monitoring system according to the present disclosure includes: an optical fiber (10) configured to sense a peripheral environmental state, a monitor's terminal (40), a receiving unit (20) configured to receive an optical signal containing information indicating the environmental state from the optical fiber (10), a detecting unit (32) configured to detect at least one of an accident and an incident, based on the information indicating the environmental state, being included in the optical signal, and a broadcasting unit (33) configured to broadcast that the accident or the incident has occurred to the monitor's terminal (40) when the detecting unit (32) determines that the accident or the incident has occurred.

14 Claims, 11 Drawing Sheets

(58) Field of Classification Search
CPC .......... H04B 10/07957; H04B 10/2507; G01H 9/004; G01H 9/002; G01H 9/006; G01D 5/35361; G01D 5/353
USPC ........ 398/16, 20, 10, 13, 17, 25, 26, 27, 33, 398/38, 31, 32, 30, 21
See application file for complete search history.

(56) References Cited

U.S. PATENT DOCUMENTS

| | | |
|---|---|---|
| 2020/0191613 A1 | 6/2020 | Englund |
| 2022/0277641 A1 | 9/2022 | Yoda et al. |

FOREIGN PATENT DOCUMENTS

| | | |
|---|---|---|
| JP | 2013-185922 A | 9/2013 |
| JP | 2016-040685 A | 3/2016 |
| JP | 2017-134673 A | 8/2017 |
| JP | 2019-537721 A | 12/2019 |
| WO | 2021/029196 A1 | 2/2021 |

\* cited by examiner

MONITORING SYSTEM, MONITORING DEVICE, AND MONITORING METHOD

This application is a National Stage Entry of PCT/JP2020/009053 filed on Mar. 4, 2020, the contents of all of which are incorporated herein by reference, in their entirety.

TECHNICAL FIELD

The present disclosure relates to a monitoring system, a monitoring device, and a monitoring method.

BACKGROUND ART

Conventionally, occurrence of an accident or an incident is recognized by police, a fire station, an ambulance station, or the like by being notified by a person being present in a periphery of a site or by a person involved in the accident or the incident.

However, the notification is not necessarily made in real time, and such delay in notification may result in a secondary disaster.

Meanwhile, a technique called optical fiber sensing, which employs an optical fiber as a sensor and enables real time sensing, has recently been attracting attention, and various proposals have been made using the optical fiber sensing.

For example, Patent Literature 1 discloses a technique of detecting vibration intensity by laying an optical fiber along a structure and utilizing a characteristic that a polarization state of light propagating through the optical fiber changes when vibration is imparted to the structure. Patent Literature 1 also discloses a technique of issuing an alarm to a manager or the like when the vibration intensity is equal to or higher than a threshold value.

Patent Literature 2 discloses a technique of detecting an accident of removal of an attachment such as a bolt in real time by laying optical fibers on a plurality of power transmission towers and detecting vibration occurring when such an attachment is removed from the power transmission tower as an abnormal signal. Patent Literature 2 also discloses a technique of identifying a power transmission tower where the vibration has occurred.

CITATION LIST

Patent Literature

Patent Literature 1: Japanese Unexamined Patent Application Publication No. 2013-185922
Patent Literature 2: Japanese Unexamined Patent Application Publication No. 2002-152937

SUMMARY OF INVENTION

Technical Problem

However, according to the technique disclosed in Patent Literature 1, an alarm is simply emitted when the vibration intensity of the structure is equal to or higher than the threshold value, and a type of event occurring at a location where the vibration intensity is equal to or higher than the threshold value is not determined.

Therefore, the technique disclosed in Patent Literature 1 has a problem that accidents and incidents cannot be monitored at all.

The technique disclosed in Patent Literature 2 is focused on detection of an accident of removal of an attachment in an area where the power transmission towers are installed, and thus accidents and incidents in other areas cannot be detected.

Therefore, the technique disclosed in Patent Literature 2 has a problem that accidents and incidents cannot be monitored in a wide range.

Accordingly, an object of the present disclosure is to solve the problems described above and provide a monitoring system, a monitoring device, and a monitoring method that enable monitoring of accidents and incidents occurring at a periphery of an optical fiber in a wide range.

Solution to Problem

A monitoring system according to one aspect includes:
an optical fiber configured to sense a peripheral environmental state;
a monitor's terminal;
a receiving unit configured to receive an optical signal containing information indicating the environmental state, from the optical fiber;
a detecting unit configured to detect at least one of an accident and an incident, based on the information indicating the environmental state, the information being contained in the optical signal; and
a broadcasting unit configured to broadcast that the accident or the incident has occurred, to the monitor's terminal when the detecting unit determines that the accident or the incident has occurred.

A monitoring device according to one aspect includes:
an acquiring unit configured to acquire information indicating a peripheral environmental state, the information being contained in an optical signal received from an optical fiber configured to sense the environmental state;
a detecting unit configured to detect at least one of an accident and an incident, based on the information indicating the environmental state; and
a broadcasting unit configured to broadcast that the accident or the incident has occurred, to a monitor's terminal when the detecting unit determines that the accident or the incident has occurred.

A monitoring method according to one aspect is a monitoring method by a monitoring system, the method including:
a receiving step of receiving an optical signal from an optical fiber configured to sense a peripheral environmental state, the optical signal containing information indicating the environmental state;
a detecting step of detecting at least one of an accident and an incident, based on the information indicating the environmental state, the information being contained in the optical signal; and
a broadcasting step of broadcasting that the accident or the incident has occurred, to a monitor's terminal when it is determined that the accident or the incident has occurred in the detecting step.

Advantageous Effects of Invention

According to the aspects described above, an advantageous effect is achieved that a monitoring system, a monitoring device, and a monitoring method that are able to monitor accidents and incidents in the periphery of the optical fiber in a wide range are provided.

EXAMPLE EMBODIMENT

Hereinafter, example embodiments of the present disclosure will be described with reference to the drawings. Note that descriptions and drawings given below are abbreviated and simplified as appropriate for clarity of the descriptions. In each of the drawings given below, identical elements are denoted by the same reference signs, and duplicated explanations are omitted where necessary.

First Example Embodiment

Figure 1:
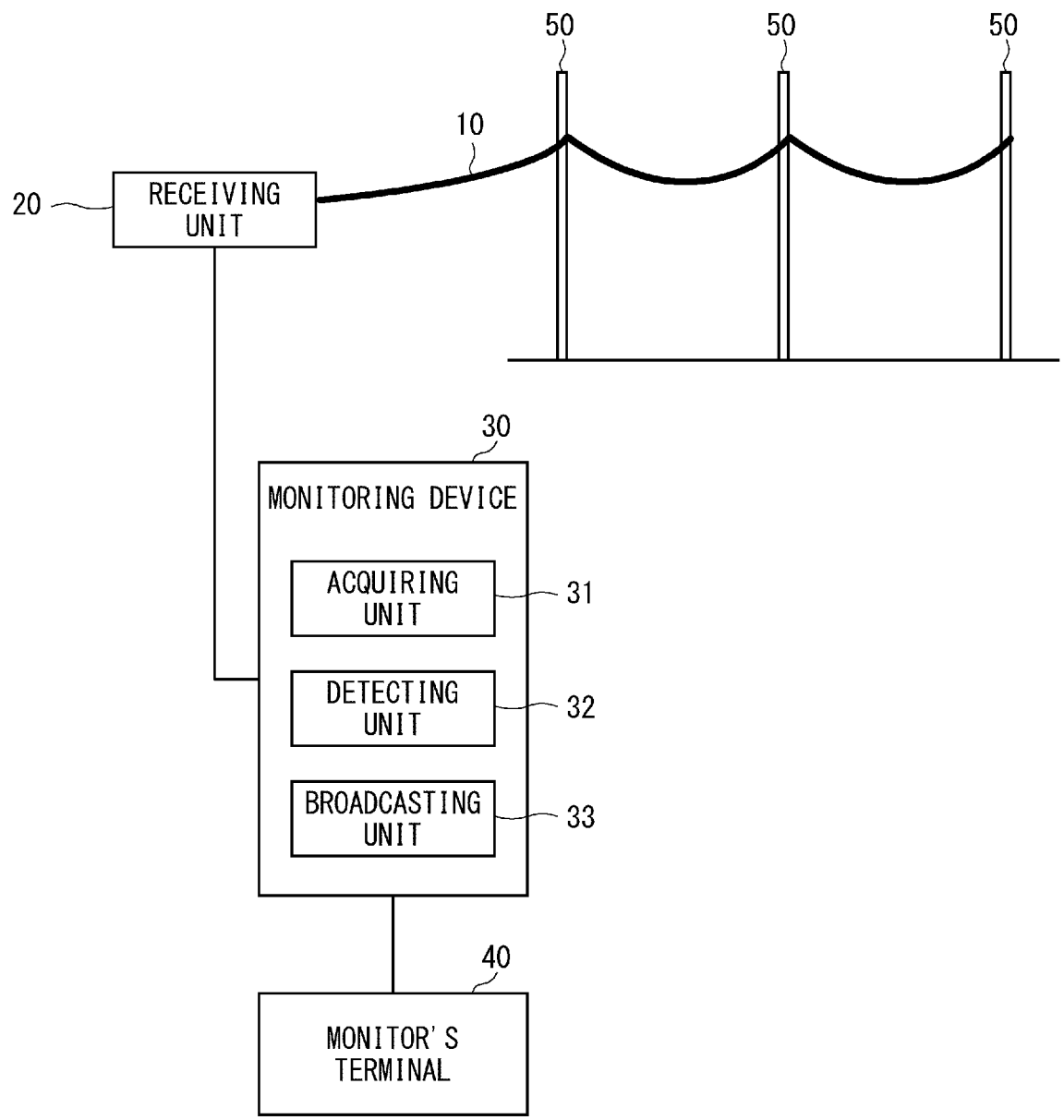
FIG. 1 is a diagram illustrating a configuration example of a monitoring system according to a first example embodiment.

Referring now to FIG. 1, a configuration example of a monitoring system according to a first example embodiment will be described.

As illustrated in FIG. 1, the monitoring system according to the first example embodiment includes an optical fiber 10, a receiving unit 20, a monitoring device 30, and a monitor's terminal 40. The monitoring device 30 includes an acquiring unit 31, a detecting unit 32, and a broadcasting unit 33. Note that the monitoring device 30 may be installed at a location apart from the receiving unit 20 and, for example, may be installed in the cloud.

The optical fiber 10 is laid on a plurality of poles 50 (three poles 50 in FIG. 1) and connected at one end to the receiving unit 20. However, the method of laying the optical fiber 10 is not limited to that illustrated in FIG. 1. For example, the optical fiber 10 may be buried underground. In addition, the optical fiber 10 may be an optical fiber dedicated exclusively to sensing or may be an optical fiber used for both communication and sensing. When the optical fiber 10 is the optical fiber used for both communication and sensing, an optical signal for sensing is divided by a filter, not illustrated, at a phase before the receiving unit 20 to allow the receiving unit 20 to receive only the optical signal for sensing. While only one optical fiber 10 is provided in FIG. 1, a plurality of the optical fibers 10 may be provided.

The receiving unit 20 receives the optical signal (the optical signal for sensing. The same applies hereinafter) from the optical fiber 10. For example, the receiving unit 20 sends a pulsed light to the optical fiber 10 and receives backscattered light, which is generated as the pulsed light is transmitted through the optical fiber 10, as an optical signal.

Vibration, sound, temperature, or the like generated in the periphery of the optical fiber 10 is transmitted to the optical fiber 10. Consequently, the optical signal transmitted through the optical fiber 10 changes in characteristics (for example, wavelength). Therefore, the optical fiber 10 is capable of sensing an environmental state in the periphery of the optical fiber 10, and the optical signal received by the receiving unit 20 contains information indicating the environmental state in the periphery of the optical fiber 10 sensed by the optical fiber 10. Note that the information indicating the environmental state in the periphery of the optical fiber 10 needs only to indicate at least one of the state of vibration, the state of sound, and the state of temperature in the periphery of the optical fiber 10.

When an accident or an incident occurs in the periphery of the optical fiber 10, vibration and sound may be generated, or a temperature change may occur. For example, if a traffic accident occurs, vibration and a collision noise may be generated. Alternatively, if a shooting incident occurs, vibration and gunshot sound may be generated. Alternatively, if a bombing incident occurs, vibration or explosion noise may be generated, or a temperature change may occur. Alternatively, if a fire accident occurs, vibration or fire noise may be generated, or a temperature change may occur. Alternatively, when accidents and incidents occur, in general, a screaming sound may be given by person present in the periphery of the site or persons involved by the accident and the incident.

Therefore, the detecting unit 32 is enabled to detect accidents and incidents in the periphery of the optical fiber 10 by analyzing information indicating the environmental state in the periphery of the optical fiber 10, which is contained in the optical signal received by the receiving unit 20.

Accordingly, the acquiring unit 31 acquires information indicating the environmental state in the periphery of the optical fiber 10, which is contained in the optical signal received by the receiving unit 20. The detecting unit 32 then detects at least one of an accident and an incident in the periphery of the optical fiber 10 based on information indicating the environmental state in the periphery of the optical fiber 10, which is acquired by the acquiring unit 31.

When the detecting unit 32 determines that an accident or an incident has occurred in the periphery of the optical fiber 10, the broadcasting unit 33 broadcasts that the accident or the incident has occurred, to a monitor's terminal 40 via telephone, by e-mail, or the like. Note that the monitor's terminal 40 is installed at a location where monitors such as police, fire, or ambulance stations are present.

Now, the method of detecting an accident or an incident in the periphery of the optical fiber 10 by the detecting unit 32 will be described in detail.

When an accident or an incident occurs in the periphery of the optical fiber 10, the information indicating the environmental state in the periphery of the optical fiber 10 sensed by the optical fiber 10 contains a vibration pattern of vibration, an acoustic pattern of the sound, and a temperature pattern of the temperature generated as a result of the accident or the incident that has occurred. The vibration pattern, the acoustic pattern, and the temperature pattern are variable patterns, which are dynamically varying patterns, and are unique varying patterns according to the type of the accident or the incident that has occurred. For example, the vibration pattern is a variable pattern which varies in terms of the intensity of vibration, the position of vibration, and the transition of variation of the vibration frequency according to the type of the accident or the incident that has occurred.

In other words, when an accident or an incident occurs in the periphery of the optical fiber 10, the information indicating the environmental state in the periphery of the optical fiber 10 sensed by the optical fiber 10 contains the unique vibration pattern, acoustic pattern, and temperature pattern that dynamically vary according to the type of the accident or the incident that has occurred. Using this, the detecting unit 32 detects the accidents and incidents in the periphery of the optical fiber 10 in a manner described below. Note that the following describes an example of using the vibration pattern to detect an accident or an incident in the periphery of the optical fiber 10 as an example.

(A) Method A

For each accident and incident to be detected, the detecting unit 32 stores a vibration pattern of the vibration that has been generated actually when the accidents or the incidents have occurred in a memory or the like, not illustrated, in advance as patterns for matching.

First of all, the acquiring unit 31 acquires information indicating the environmental state in the periphery of the optical fiber 10, which is contained in the optical signal received by the receiving unit 20.

Consequently, the detecting unit 32 compares a vibration pattern contained in the information acquired by the acquiring unit 31 with the patterns for matching. When the patterns for matching include a pattern for matching that matches the vibration pattern with a matching rate with respect to the vibration pattern equal to or higher than the threshold value, the detecting unit 32 determines that an accident or an incident relevant to that pattern for matching has occurred.

(B) Method B

For each accident and incident to be detected, the detecting unit 32 prepares a set of teacher data indicating the accident or incident and a vibration pattern of vibration generated actually when the accident or incident has occurred and inputs each prepared set to construct a learning model using a convolutional neural network (CNN) in advance and stores them in a memory or the like, not illustrated, in advance.

First of all, the acquiring unit 31 acquires information indicating the environmental state in the periphery of the optical fiber 10, which is contained in the optical signal received by the receiving unit 20.

Consequently, the detecting unit 32 inputs the vibration pattern contained in the information acquired by the acquiring unit 31 into the learning model. Accordingly, when an accident or the incident to be detected has occurred in the periphery of the optical fiber 10, the detecting unit 32 obtains information on the accident or the incident in the periphery of the optical fiber 10 as an output of the learning model.

In this manner, according to the method A and the method B, the detecting unit 32 is not only capable of determining the occurrence of an accident or an incident in the periphery of the optical fiber 10, but also capable of identifying the type of the accident or the incident that has occurred.

Therefore, in this case, the broadcasting unit 33 may, not only broadcast that an accident or an incident has occurred in the periphery of the optical fiber 10, but also notify the type of the accident or the incident that has occurred, to the monitor's terminal 40.

Furthermore, the detecting unit 32 may identify at least one of the time of occurrence and the location of occurrence of the accident or the incident that has occurred in the periphery of the optical fiber 10. In this case, the broadcasting unit 33 may, not only broadcast that the accident or the incident has occurred in the periphery of the optical fiber 10, but also notify at least one of the time of occurrence and the location of occurrence of the accident or the incident that has occurred, to the monitor's terminal 40.

Figure 2:
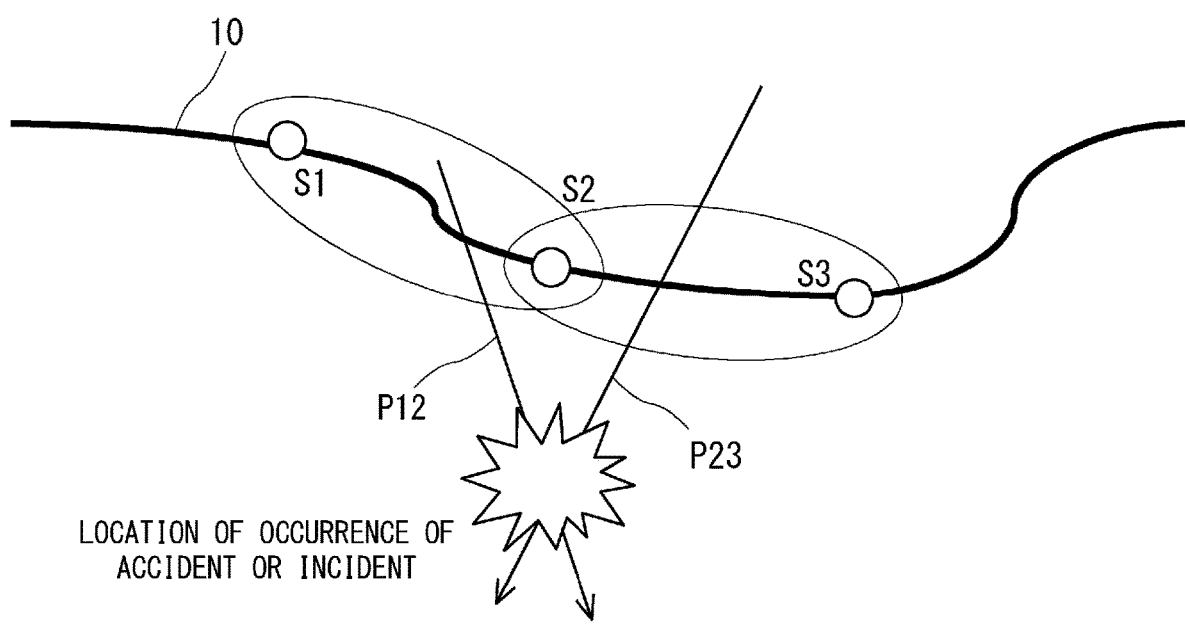
FIG. 2 is a diagram illustrating a method of identifying a location of occurrence of an accident or an incident by a detecting unit according to the first example embodiment.
Figure 3:
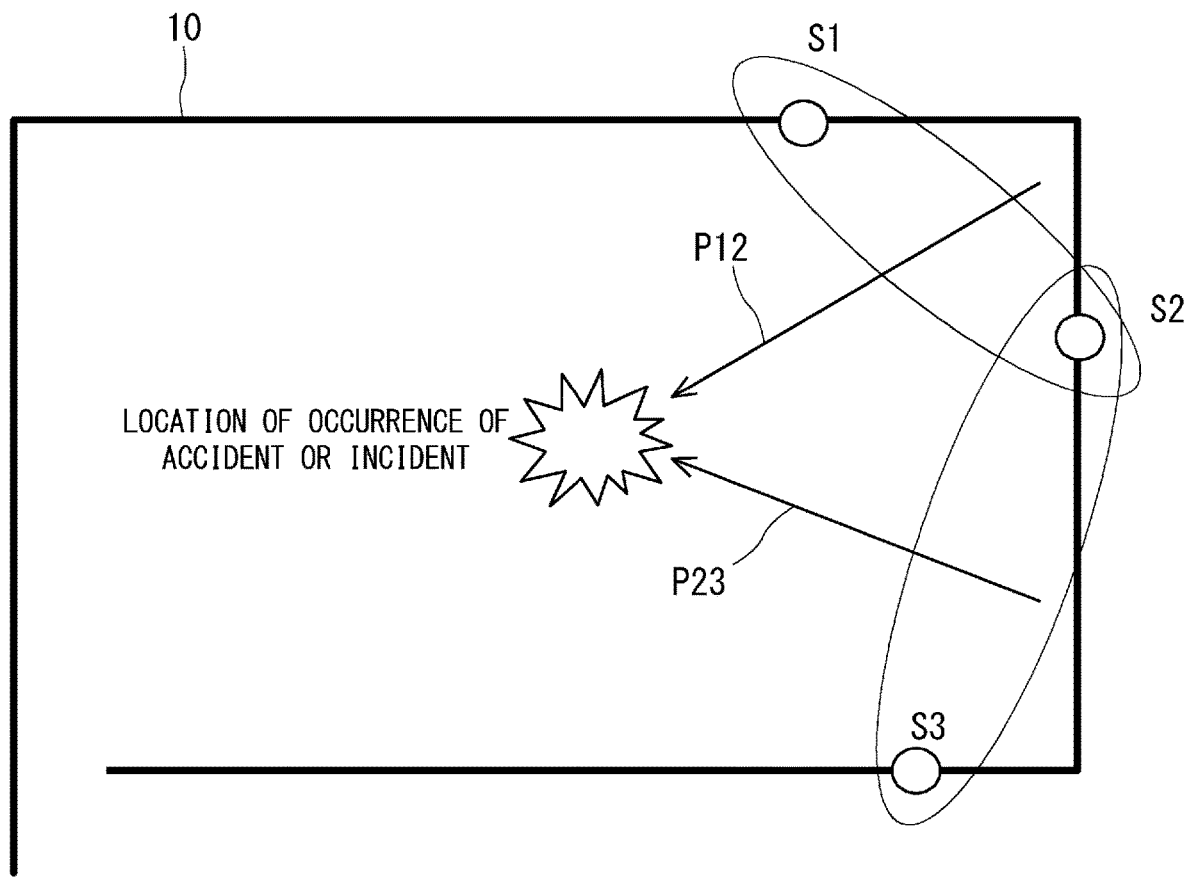
FIG. 3 is a diagram illustrating the method of identifying the location of occurrence of the accident or the incident by the detecting unit according to the first example embodiment.

Referring now to FIG. 2 and FIG. 3, an example of a method of identifying the time of occurrence and the location of occurrence of an accident or an incident that has occurred in the periphery of the optical fiber 10 by the detecting unit 32 will be described. Note that the description given below will be based on an assumption that the detecting unit 32 identifies the type of an accident or an incident by using an acoustic pattern (hereinafter, referred to as "acoustic pattern AP") according to the accident or the incident that has occurred in the periphery of the optical fiber 10.

For example, the detecting unit 32 is capable of identifying positions on the optical fiber 10, where the optical signal including the acoustic pattern AP is generated (the distances of the optical fiber 10 from the receiving unit 20) based on a time difference between the time when the receiving unit 20 has sent a pulsed light to the optical fiber 10 and the time when the receiving unit 20 has received the optical signal containing the acoustic pattern AP from the optical fiber 10.

Therefore, the detecting unit 32 identifies at least three positions on the optical fiber 10, where the optical signal containing the acoustic pattern AP is generated and specifies at least three positions among the identified positions on the optical fiber 10 as sensing points.

In the example illustrated in FIG. 2, the optical fiber 10 is laid in a curved shape, and the detecting unit 32 specifies three positions on the optical fiber 10 as sensing points S1 to S3. First, the detecting unit 32 selects, for example, the sensing points S1 and S2, as two arbitrary sensing points. The detecting unit 32 derives the intensity difference and the time difference between the sounds of the acoustic pattern AP sensed at the two sensing points S1 and S2 based on the distribution (intensity and time) of the sounds of the acoustic pattern AP sensed at the two sensing points S1 and S2, and then estimates the position of a sound source of the sound of the acoustic pattern AP. Here, the position of the sound source is estimated as being at any position on a line P12. Then, the detecting unit 32 selects, for example, the sensing points S2 and S3 as two sensing points in a combination different from the two points selected above. The detecting unit 32, then, estimates the position of the sound source of the sound of the acoustic pattern AP in the same manner as described above. Here, the position of the sound source estimated as being at any position on a line P23. The detecting unit 32, then, identifies the position where the line P12 and the line P23 intersect as the position of the sound source of the sound of the acoustic pattern AP, and identifies the position of the identified sound source as a location of occurrence of the accident or the incident. The detecting unit 32 also identifies the time of occurrence when the sound of the acoustic pattern AP is detected at any of the three sensing points S1 to S3 as the time of generation of the sound of the acoustic pattern AP and identifies the identified time of occurrence as the time of occurrence of the accident or the incident. At this time, the detecting unit 32 may identify the time when the acoustic pattern AP having the highest sound intensity among those sensed at the three sensing points S1 to S3 is sensed as the time of occurrence of the accident or the incident.

In the example illustrated in FIG. 3, the optical fiber 10 is laid in a rectangular shape, and the detecting unit 32 specifies three points on the optical fiber 10 as the sensing points S1 to S3. In the example illustrated in FIG. 3 as well, the method of identifying the location of occurrence and the time of occurrence of an accident or an incident is the same as illustrated in FIG. 2.

Note that, in the example illustrated in FIG. 2 and FIG. 3, the location of occurrence of the accident and the incident is identified based on the position on the optical fiber 10, where the optical signal containing the acoustic pattern is generated, but the method of identification is not limited thereto. For example, based on the position on the optical fiber 10, where the optical signal containing a vibration pattern is generated, the position of the vibration of the vibration pattern may be identified, and the identified position of the vibration source may be identified as the location of occurrence of the accident or the incident.

Figure 4:
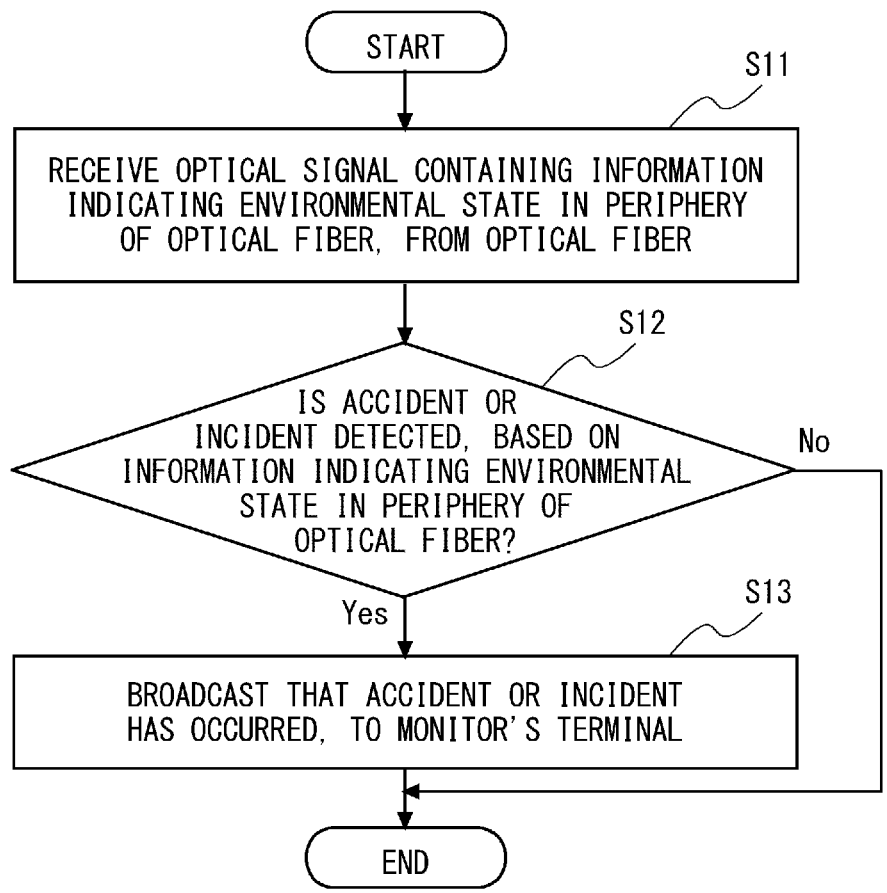
FIG. 4 is a flowchart indicating an example of a flow of operation of a monitoring system according to the first example embodiment.

Referring next to FIG. 4, a flow of operation of the monitoring system according to a first example embodiment will be described.

As illustrated in FIG. 4, the receiving unit 20 receives an optical signal containing information indicating the environmental state in the periphery of the optical fiber 10 from the optical fiber 10 (Step S11).
Subsequently, the acquiring unit 31 acquires information indicating the environmental state in the periphery of the optical fiber 10, which is contained in the optical signal received by the receiving unit 20, and the detecting unit 32 detects the accident or the incident in the periphery of the optical fiber 10 based on the information indicating the environmental state in the periphery of the optical fiber 10 (Step S12). Detection of the accident or the incident may be performed by using, for example, any of the method A or B described above.

When the detecting unit 32 determines that an accident or an incident has occurred in Step S12 (Yes in Step S12), the broadcasting unit 33 broadcasts that the accident or the incident has occurred, to the monitor's terminal 40 (Step S13).

As described above, according to the present first example embodiment, the receiving unit 20 receives an optical signal containing information indicating the environmental state in the periphery of the optical fiber 10 from the optical fiber 10. The detecting unit 32 detects an accident or an incident in the periphery of the optical fiber 10 based on information indicating the environmental state in the periphery of the optical fiber 10 and included in the optical signal. When the detecting unit 32 determines that an accident or an incident has occurred in the periphery of the optical fiber 10, the broadcasting unit 33 broadcasts that the accident or the incident has occurred in the periphery of the optical fiber 10 to the monitor's terminal 40. This allows monitoring of accidents or incidents within a range where the optical fiber 10 is laid, so that the accidents and the incidents can be monitored in a wide range. In addition, this contributes to reduction of the probability of occurrence of secondary disasters.

Second Example Embodiment

Figure 5:
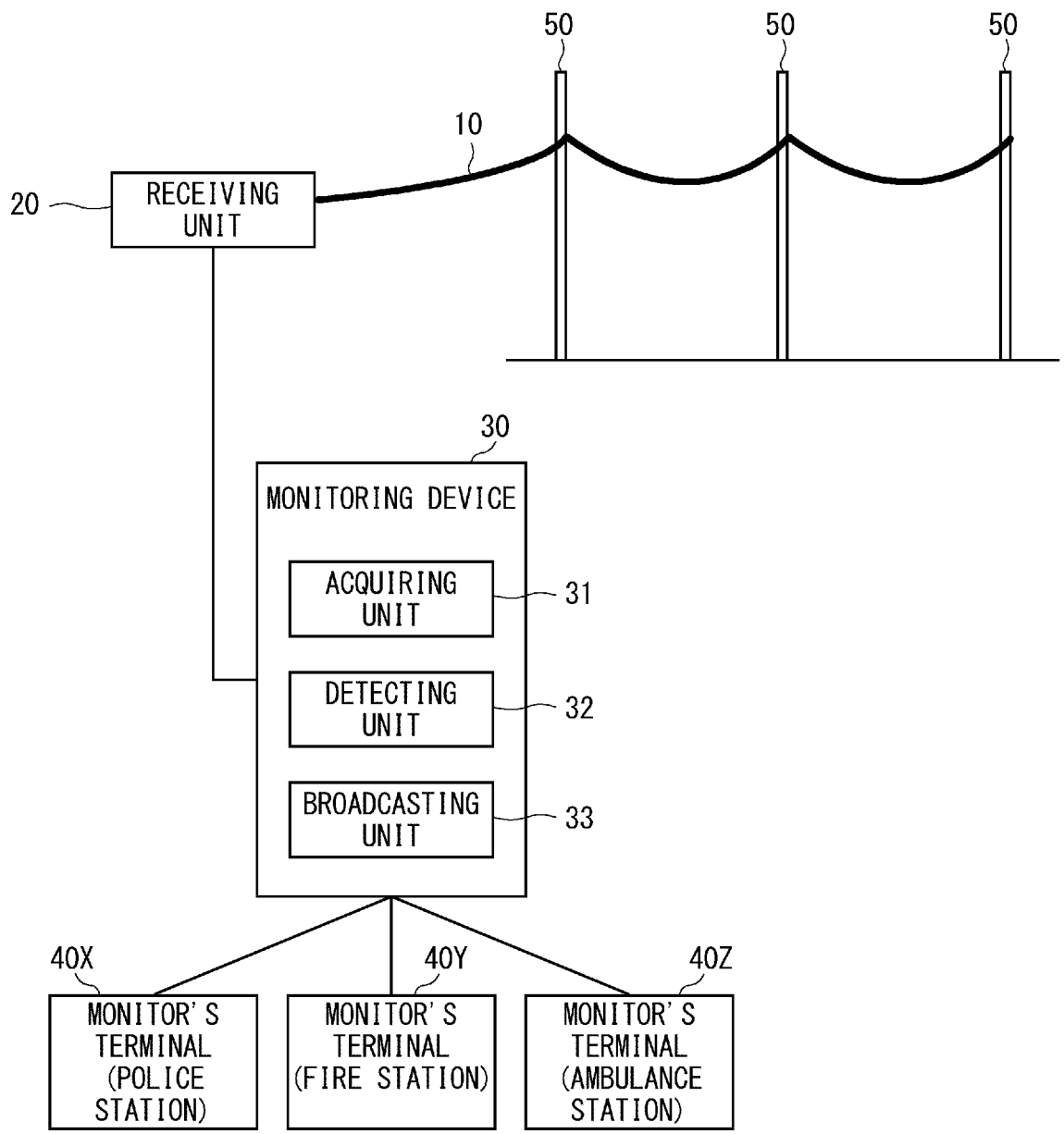
FIG. 5 is a diagram illustrating a configuration example of a monitoring system according to a second example embodiment.

Referring next to FIG. 5, a configuration example of a monitoring system according to a second example embodiment will be described.

As illustrated in FIG. 5, the monitoring system according to the present second example embodiment is different from the configuration of the first example embodiment described above in that a plurality of the monitor's terminals 40X, 40Y, and 40Z are provided. In the following description, the monitor's terminal in general, i.e., when not specifying the specific one of the monitor's terminals 40X, 40Y, and 40Z, is referred to as "monitor's terminal 40" as appropriate.

Note that the three monitor's terminals 40X, 40Y, and 40Z are provided in FIG. 5, but the number of the monitor's terminals 40 needs only to be plural and is not limited to three. In the illustration, the monitor's terminal 40X is installed in the police station, the monitor's terminal 40Y is installed in the fire station, and the monitor's terminal 40Z is installed in the ambulance station, but the types of the monitor's terminal 40 is not limited thereto.

In the first example embodiment described above, only one monitor's terminal 40 is provided as a broadcasting destination in case of occurrence of an accident or an incident in the periphery of the optical fiber 10.

However, the appropriate broadcasting destination is likely to vary according to the type of the accident or the incident that has occurred in the periphery of the optical fiber 10. For example, in the event of occurrence of a traffic accident, the police and ambulance stations are considered to be appropriate as the broadcasting destinations. For example, in the event of occurrence of a traffic accident, the fire station is considered to be appropriate as the broadcasting destination. For example, in the event of occurrence of a shooting incident, a bombing incident, or an accident or an incident involving screaming sound, the police station is considered to be appropriate as the broadcasting destination.

Accordingly, in the second example embodiment, when the detecting unit 32 determines that an accident or an incident has occurred in the periphery of the optical fiber 10, the detecting unit 32 identifies the type of the accident or the incident that has occurred. Identification of the type of the accident or the incident may be performed by using, for example, any of the method A or B described above.

The broadcasting unit 33 specifies an appropriate monitor's terminal 40 among the plurality of monitor's terminals 40X, 40Y, and 40Z according to the type of the accident or the incident that has occurred in the periphery of the optical fiber 10 and broadcasts that the accident or the incident has occurred in the periphery of the optical fiber 10, to the specified monitor's terminal 40. In this case, the broadcasting unit 33 may notify the specified monitor's terminal 40 of the type of the accident or the incident that has occurred in the periphery of the optical fiber 10.

Furthermore, the detecting unit 32 may identify at least one of the time of occurrence and the location of occurrence of the accident or the incident that has occurred in the periphery of the optical fiber 10. Identification of the time of occurrence or the location of occurrence of the accident or the incident may be performed by using, for example, the method described in conjunction with FIG. 2 and FIG. 3 above. In this case, the broadcasting unit 33 may notify the specified monitor's terminal 40 of at least one of the time of occurrence and the location of occurrence of the accident or the incident that has occurred.

Figure 6:
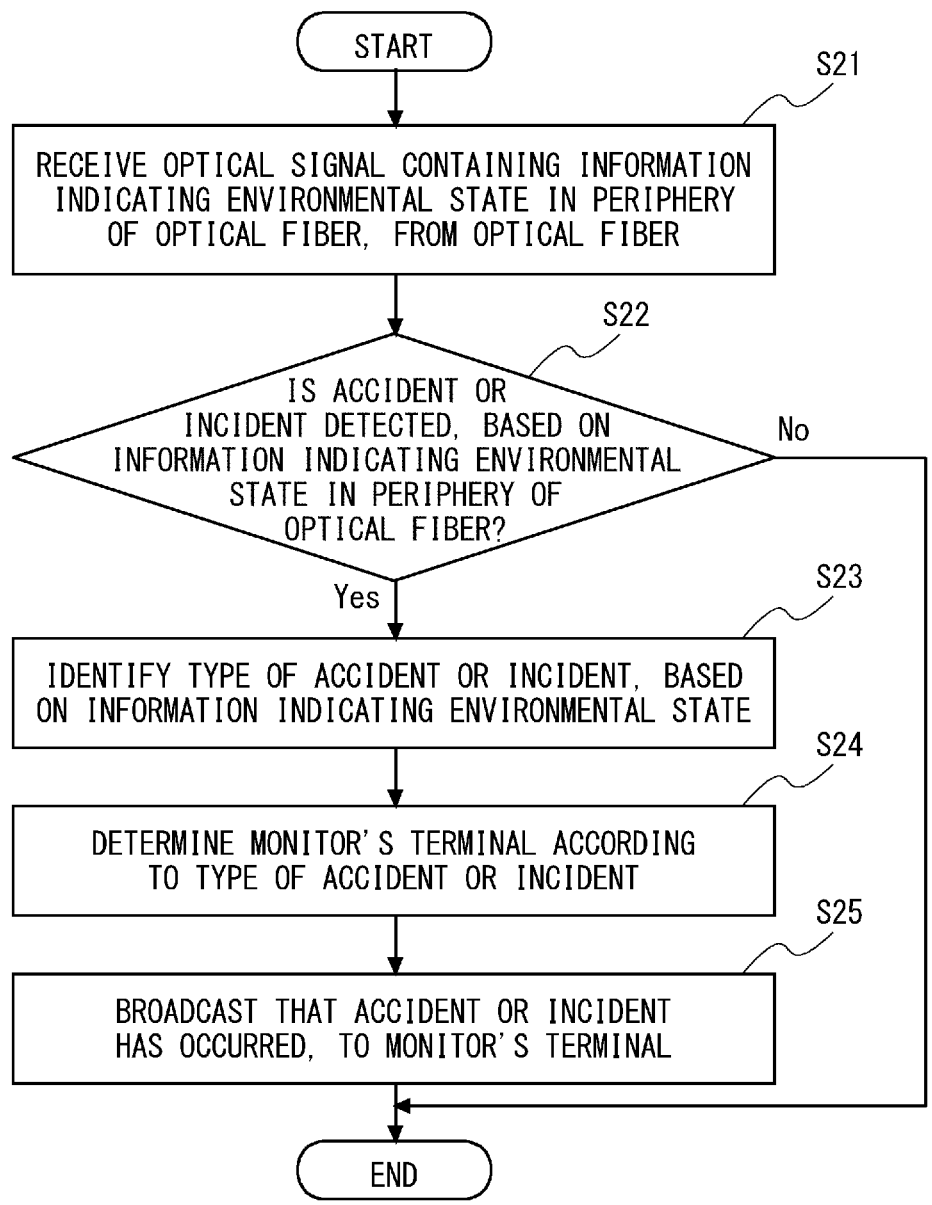
FIG. 6 is a flowchart indicating an example of a flow of operation of a monitoring system according to the second example embodiment.

Referring next to FIG. 6, a flow of operation of the monitoring system according to the second example embodiment will be described.

As illustrated in FIG. 6, Steps S21 and S22, which are similar to Steps S11 and S12 in FIG. 4, are performed.

In Step S22, when the detecting unit 32 determines that an accident or an incident has occurred in the periphery of the optical fiber 10 (Yes in Step S22), the detecting unit 32 subsequently identifies the type of the accident or the incident that has occurred based on information indicating the environmental state in the periphery of the optical fiber 10, which is contained in the optical signal received by the receiving unit 20 (Step S23). Identification of the type of the accident or the incident may be performed by using, for example, the method A or B described above. Using the method A or B described above enables a series of processes including determining that an accident or an incident has occurred in Step S22 and identifying the type of the accident or the incident in Step S23 to be performed.

Subsequently, the broadcasting unit 33 specifies an appropriate monitor's terminal 40 from among the plurality of monitor's terminals 40X, 40Y, and 40Z according to the type of the accident or the incident that has occurred in the periphery of the optical fiber 10 (Step S24).

Subsequently, the broadcasting unit 33 broadcasts that the accident or the incident has occurred in the periphery of the optical fiber 10, to the specified monitor's terminal 40 (Step S25). In this case, the broadcasting unit 33 may notify the specified monitor's terminal 40 of the type of the accident or the incident that has occurred in the periphery of the optical fiber 10.

As described above, according to the second example embodiment, when the detecting unit 32 determines that an accident or an incident has occurred in the periphery of the optical fiber 10, the detecting unit 32 identifies the type of the accident or the incident. The broadcasting unit 33 specifies an appropriate monitor's terminal 40 according to the type of the accident or the incident that has occurred in the periphery of the optical fiber 10, and broadcasts that the accident or the incident has occurred in the periphery of the optical fiber 10, to the specified monitor's terminal 40. This allows broadcasting to be performed to an appropriate monitor according to the type of the accident or the incident, and thus further contribution to reduction of probability of occurrence of secondary disasters is achieved.

Other advantageous effects are the same as those in the first example embodiment described above.

Third Example Embodiment

Figure 7:
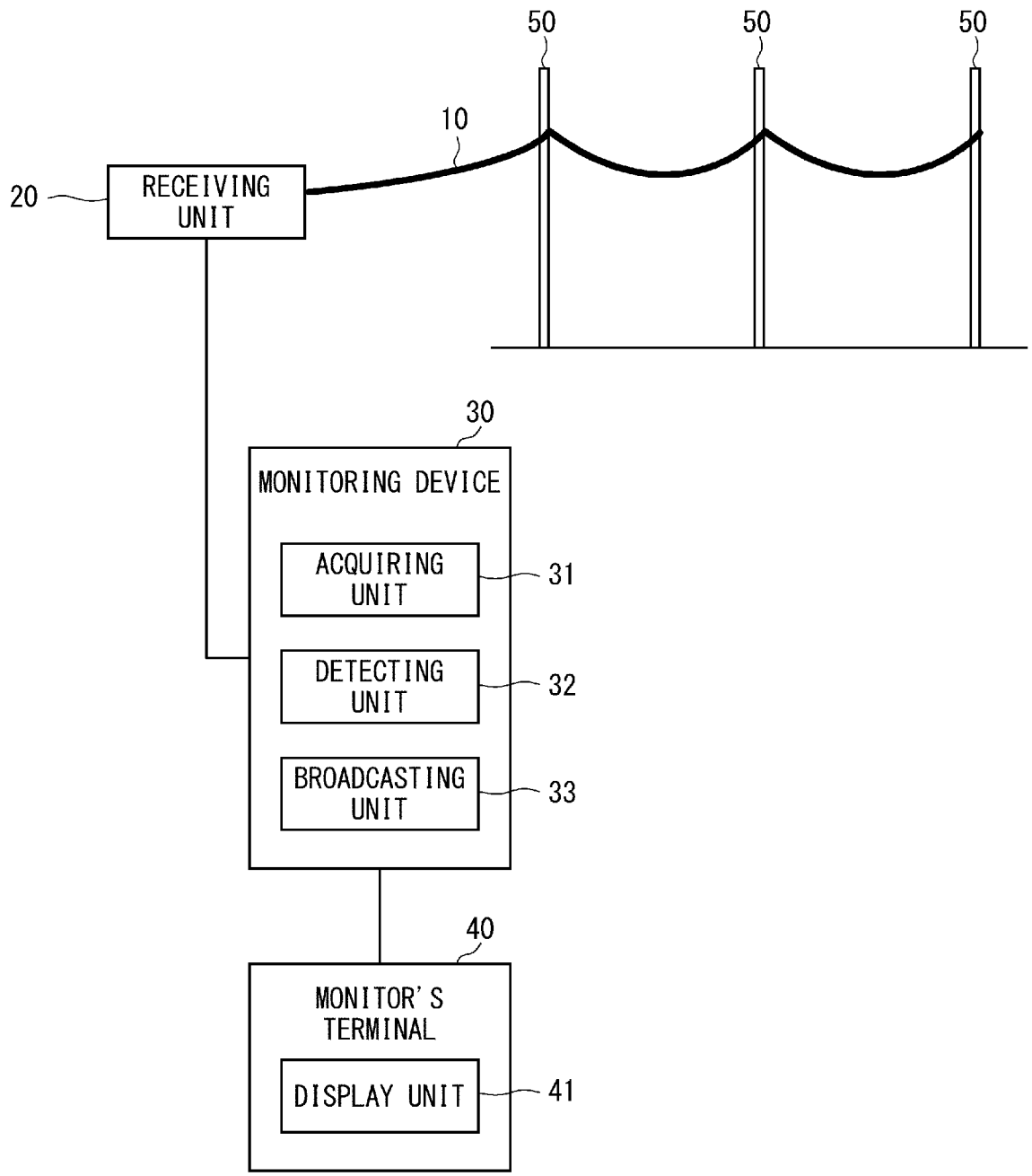
FIG. 7 is a diagram illustrating a configuration example of a monitoring system according to a third example embodiment.

Referring next to FIG. 7, a configuration example of a monitoring system according to a third example embodiment will be described.

As illustrated in FIG. 7, the monitoring system according to the present third example embodiment is different from the configuration of the first example embodiment described above in that a display unit 41 is provided in the interior of the monitor's terminal 40.

The display unit 41 is a display, a monitor, and the like that displays various types of information.

In the third example embodiment, when the detecting unit 32 determines that an accident or an incident has occurred in the periphery of the optical fiber 10, the detecting unit 32 identifies the location of occurrence of the accident or the incident that has occurred. Identification of the location of occurrence of the accident or the incident may be performed by using, for example, the method described in conjunction with FIG. 2 and FIG. 3 described above.

The broadcasting unit 33 retains map information in advance.

When the detecting unit 32 determines that an accident or an incident has occurred in the periphery of the optical fiber 10, the broadcasting unit 33 broadcasts that the accident or the incident has occurred in the periphery of the optical fiber 10, to the monitor's terminal 40 and displays a GUI (Graphical User Interface) screen on the display unit 41 with the location of occurrence of the accident or the incident superimposed on the map.

Furthermore, when the detecting unit 32 determines that an accident or an incident has occurred in the periphery of the optical fiber 10, the detecting unit 32 may identify at least one of the type and the time of occurrence of the accident or the incident. Identification of the type of the accident or the incident may be performed for example, by using the method A or B described above, and identification of the time of occurrence of the accident or the incident may be performed by using, for example, the method described in conjunction with FIG. 2 and FIG. 3. In this case, the broadcasting unit 33 may display the GUI screen on the display unit 41 with at least one of the type and the time of occurrence of the accident or the incident superimposed on the map.

Figure 8:
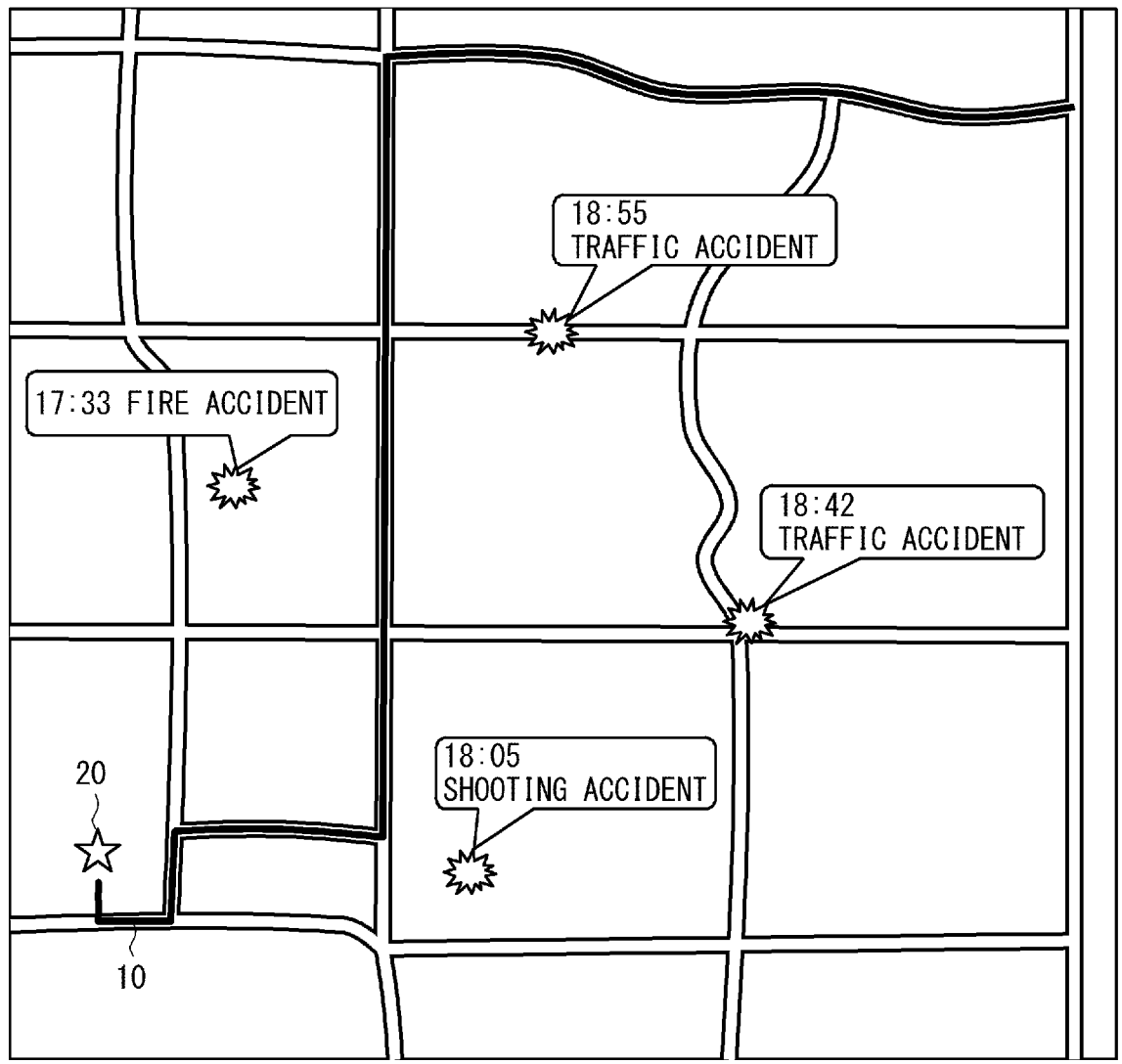
FIG. 8 is a diagram illustrating an example of a GUI screen which is displayed on a display unit by a broadcasting unit according to a third example embodiment.

FIG. 8 illustrates an example of GUI screen which is displayed on the display unit 41 by the broadcasting unit 33. Note that the map on the GUI screen in FIG. 8 is assumed to be zoomable, as necessary.

In the example in FIG. 8, information on the location of occurrence, the time of occurrence, and the type of the accident or the incident is superimposed on the map. More specifically, the location of occurrence of the accident or the incident is indicated by an icon, and the time of occurrence and the type of the accident or the incident are indicated in a balloon extending from the icon. Note that the icon may be changed in shape, color, or the like according to the type of the accident or the incident. In the example illustrated in FIG. 8, information indicating the location where the optical fiber 10 is laid is superimposed on the map, and information indicating the location of the receiving unit 20 is superimposed as a star mark.

Figure 9:
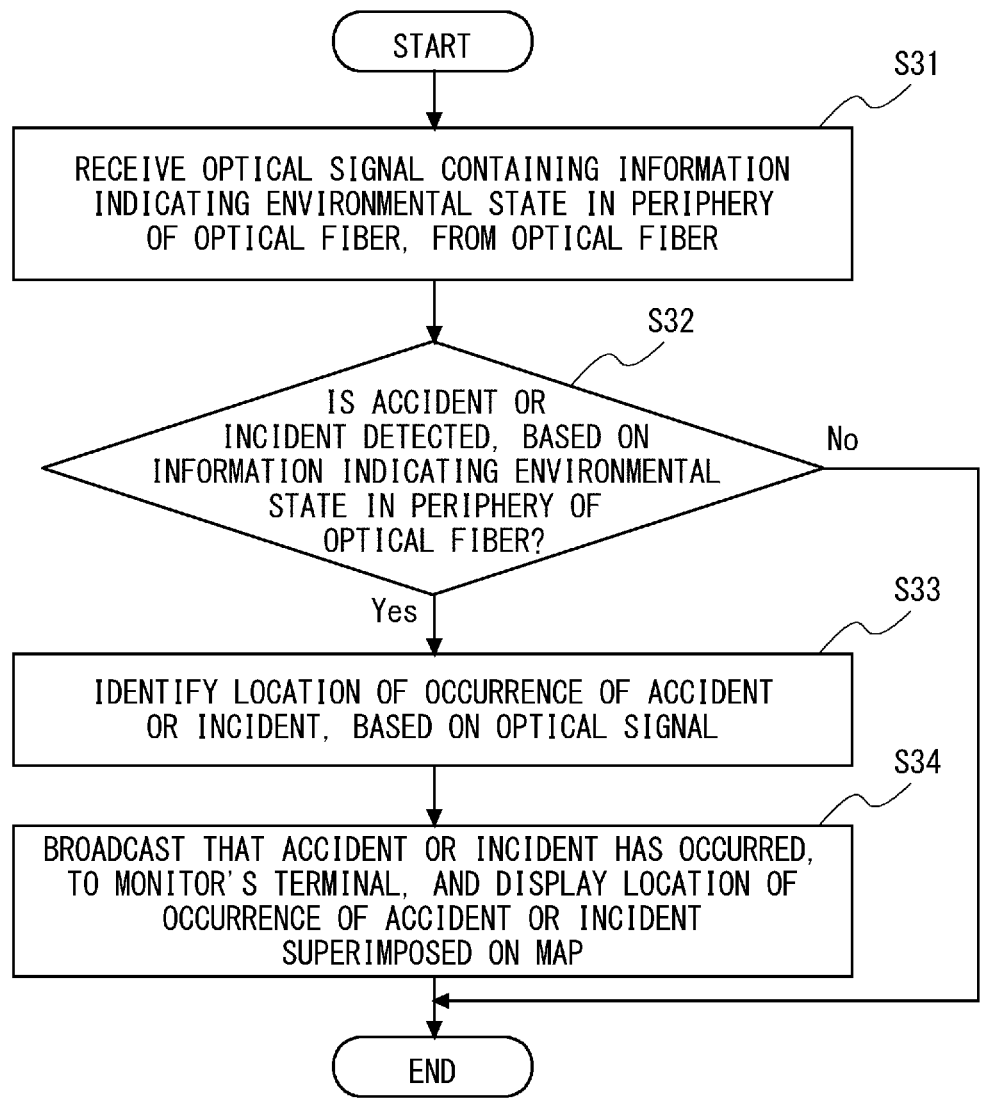
FIG. 9 is a flowchart indicating an example of a flow of operation of the monitoring system according to the third example embodiment.

Referring next to FIG. 9, a flow of operation of the monitoring system according to the third example embodiment will be described.

As illustrated in FIG. 9, Steps S31 and S32, which are similar to Steps S11 and S12 in FIG. 4 are performed.

In Step S32, when the detecting unit 32 determines that an accident or an incident has occurred in the periphery of the optical fiber 10 (Yes in Step S32), the detecting unit 32 identifies the location of occurrence of the accident or the incident that has occurred based on an optical signal received by the receiving unit 20 (Step S33). Identification of the location of occurrence of the accident or the incident may be performed by using, for example, the method described in conjunction with FIG. 2 and FIG. 3 described above.

Subsequently, the broadcasting unit 33 broadcasts that an accident or an incident have occurred in the periphery of the optical fiber 10, to the monitor's terminal 40 and displays a GUI screen on the display unit 41 with the location of occurrence of the accident and the incident superimposed on the map (Step S34). The GUI screen may be, for example, the GUI screen illustrated in FIG. 8.

As described above, according to the third example embodiment, when the detecting unit 32 determines that an accident or an incident has occurred in the periphery of the optical fiber 10, the detecting unit 32 identifies the location of occurrence of the accident or the incident that has occurred. The broadcasting unit 33 broadcasts that an accident or an incident have occurred in the periphery of the optical fiber 10, to the monitor's terminal 40 and displays a GUI screen on the display unit 41 with the location of occurrence of the accident and the incident superimposed on the map. This allows the monitor to visually determine the location of occurrence of the accident or the incident that has occurred in the periphery of the optical fiber 10.

Other advantageous effects are the same as those in the first example embodiment described above.

Other Example Embodiments

Figure 10:
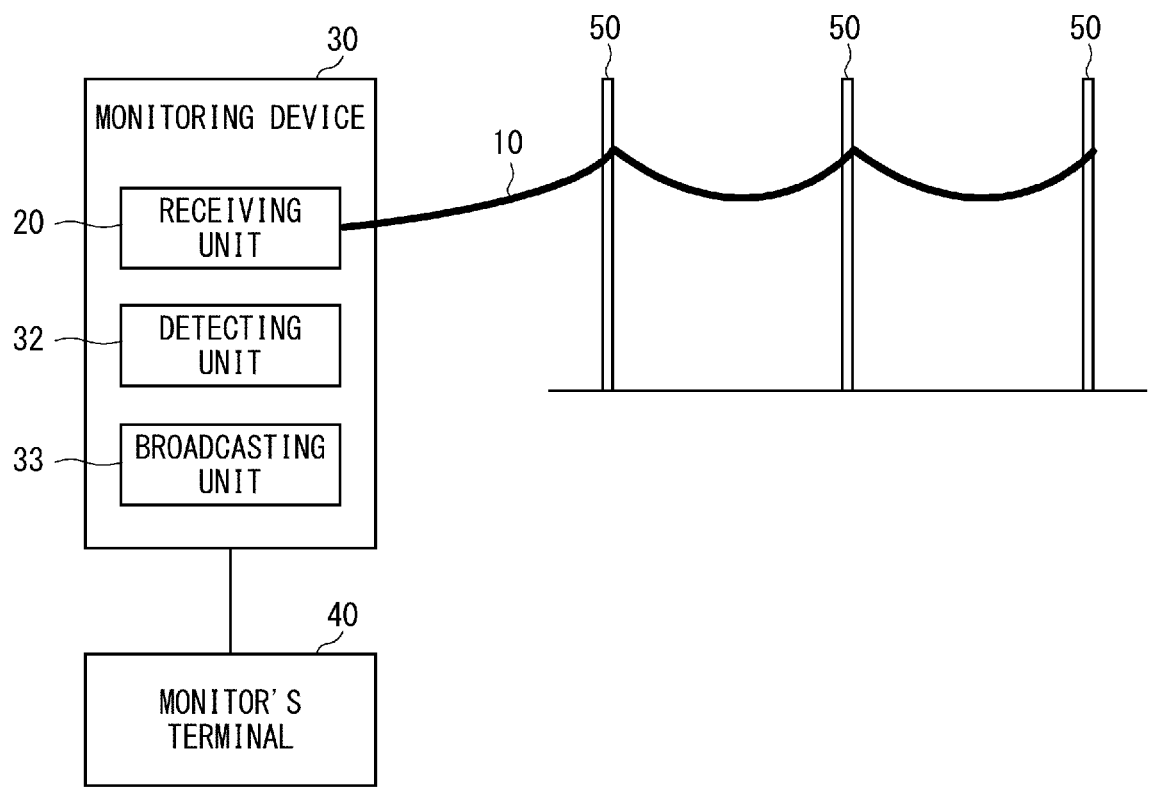
FIG. 10 is a diagram illustrating a configuration example of a monitoring system according to another example embodiment.

In the example embodiments described above, the receiving unit 20 and the monitoring device 30 are separated, but the configuration is not limited thereto. The receiving unit 20 and the monitoring device 30 may be integrated in such a manner that the receiving unit 20 is provided in the interior of the monitoring device 30. FIG. 10 illustrates a configuration example of a monitoring system configuration in which the receiving unit 20 is provided in the interior of the monitoring device 30. In the example illustrated in FIG. 10, the receiving unit 20 and the detecting unit 32 are provided in the interior of the identical monitoring device 30, and thus the acquiring unit 31 is omitted. Note that the monitoring system illustrated in FIG. 10 may be provided with the plurality of monitor's terminals 40 as in the second example embodiment or may be provided with the display unit 41 in the interior of the monitor's terminal 40 as in the third example embodiment described above.

In the example embodiments described above, one each of the receiving unit 20 and the monitoring device 30 are provided, but the configuration is not limited thereto. When a plurality of the optical fibers 10 are provided, a plurality of the receiving units 20 and a plurality of the monitoring devices 30 may be provided each relevant to the plurality of optical fibers 10.

<Hardware Configuration of Monitoring Device According to Example Embodiments>

In the following description, the configuration of the hardware of a computer 60 that realizes the monitoring device 30 according to the example embodiments descried above will be described with reference to FIG. 11.

Figure 11:
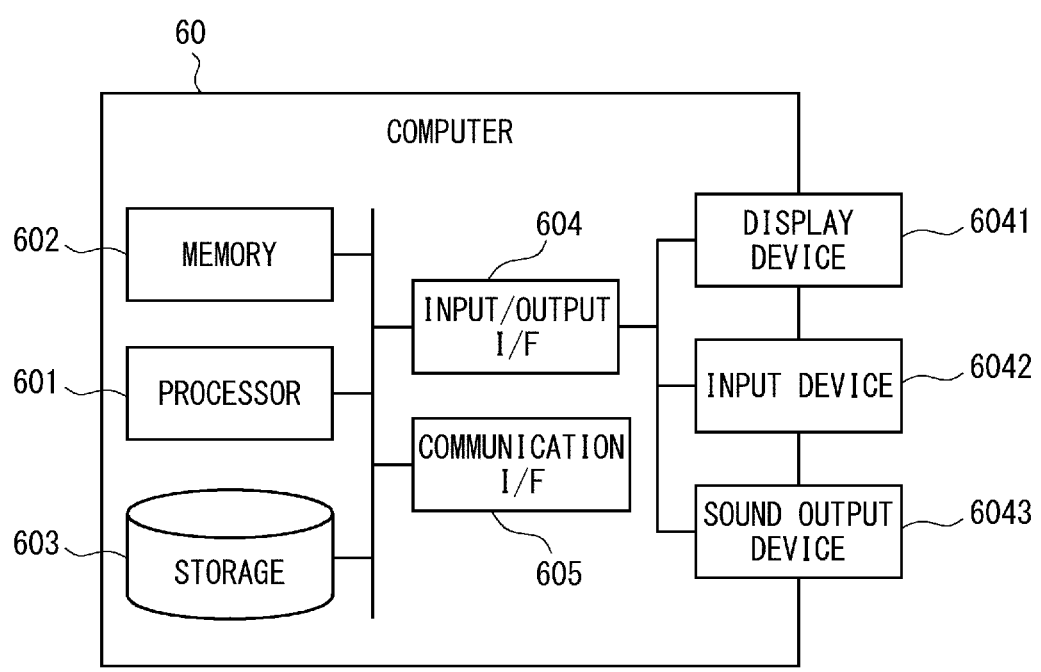
FIG. 11 is a block diagram illustrating a configuration example of hardware for a computer that realizes a monitoring device according to an example embodiment.

As illustrated in FIG. 11, the computer 60 includes a processor 601, a memory 602, a storage 603, an input/output interface (input/output I/F) 604, and a communication interface (communication I/F) 605. The processor 601, the memory 602, the storage 603, the input/output interface 604, and the communication interface 605 are connected by a data transmission path for transmitting and receiving data to each other.

The processor 601 includes an arithmetic processing unit such as CPU (Central Processing Unit) or a GPU (Graphics processing Unit). The memory 602 includes a memory such as RAM (Random Access Memory) or a ROM (Read Only Memory). The storage 603 includes a storage device such as an HDD (Hard Disk Drive), an SSD (Solid State Drive), or a memory card. The storage 603 may be a memory such as the RAM or the ROM.

The storage 603 stores programs for realizing functions of a components provided in the monitoring device 30. The processor 601 realizes the functions of the components provided in the monitoring device 30 respectively by executing each of the programs. Here, to execute each of the programs described above, the processor 601 may execute the program after reading these programs into the memory 602 or may execute without reading the program into the memory 602. The memory 602 and the storage 603 also serve to store information or data that are retained by the components provided on the monitoring device 30.

The programs described above may be stored using a variety of types of non-transitory computer readable medium and may be provided to computers (including the computer 60). Non-transitory computer readable medium includes various types of tangible storage media. Examples of the non-transitory computer readable media include, for example, magnetic recording media (for example, flexible discs, magnetic tapes, hard disk drives), magneto-optical recording media (for example, magneto-optical disks), compact disc-rom (CD-ROMs), cd-recordable (CD-Rs), semiconductor memories (for example, mask ROMs, programmable rom (PROMs), erasable prom (EPROMs), flash ROMs, and RAMs. The programs may be provided to the computers via a variety of types of transitory computer readable medium. Examples of the transitory computer readable medium include electric signals, optical signals, and electromagnetic waves. The transitory computer readable media may provide the programs to the computers via wired communication paths such as wires and optical fibers, or via wireless communication paths.

The input/output interface 604 is connected to a display device 6041, an input device 6042, a sound output device 6043 and the like. Examples of the display device 6041 includes devices such as liquid crystal displays (LCDs), cathode ray tube (CRT), and monitors, which display screens relevant to drawing data processed by the processor 601. The input device 6042 is a device for accepting operator inputs, such as keyboards, mouses, and touch sensors. The display device 6041 and the input device 6042 may be integrated to be realized as a touch panel. The sound output device 6043 is a device such as a speaker that outputs sound relevant to acoustic data processed by a processor 601.

The communication interface 605 transmits and receives data to and from external devices. For example, the communication interface 605 communicates with external devices via wired communication paths or via wireless communication paths.

The present disclosure has been described with reference to example embodiments thus far, but the present disclosure is not limited to the example embodiments described above. Various changes may be made to the configurations and details of the present disclosure that may be understood by those skilled in the art within a scope of the present disclosure.

For example, some or all of the example embodiments described above may be used in combination with each other.

In addition, the whole or part of the example embodiments disclosed above can be described as, but not limited to, the following supplementary notes.

(Supplementary Note 1)

A monitoring system comprising:
an optical fiber configured to sense a peripheral environmental state;
a monitor's terminal;

a receiving unit configured to receive an optical signal containing information indicating the environmental state, from the optical fiber;

a detecting unit configured to detect at least one of an accident and an incident, based on the information indicating the environmental state, the information being contained in the optical signal; and a broadcasting unit configured to broadcast that the accident or the incident has occurred, to the monitor's terminal, when the detecting unit determines that the accident or the incident has occurred.

(Supplementary Note 2)

The monitoring system according to Supplementary Note 1, wherein, when the detecting unit determines that the accident or the incident has occurred, the detecting unit identifies a type of the accident or the incident, based on the information indicating the environmental state, and, when the detecting unit determines that the accident or the incident has occurred, the broadcasting unit performs the broadcasting and notifies the type of the accident or the incident, to the monitor's terminal.

(Supplementary Note 3)

The monitoring system according to Supplementary Note 2, wherein, when the detecting unit determines that the accident or the incident has occurred, the broadcasting unit determines the monitor's terminal according to the type of the accident or the incident, performs the broadcasting, and notifies the type of the accident or the incident, to the determined monitor's terminal.

(Supplementary Note 4)

The monitoring system according to any one of Supplementary Notes 1 to 3, wherein, when the detecting unit determines that the accident or the incident has occurred, the detecting unit performs at least one of identifying a time of occurrence of the accident or the incident and identifying a location of occurrence of the accident or the incident, based on the optical signal, and, when the detecting unit determines that the accident or the incident has occurred, the broadcasting unit performs the broadcasting and notifies at least one of the location of occurrence and the time of occurrence of the accident or the incident, to the monitor's terminal.

(Supplementary Note 5)

The monitoring system according to Supplementary Note 1, wherein the monitor's terminal includes a display unit, when the detecting unit determines that the accident or the incident has occurred, the detecting unit identifies a location of occurrence of the accident or the incident, based on the optical signal, and, when the detecting unit determines that the accident or the incident has occurred, the broadcasting unit performs the broadcasting to the monitor's terminal and displays a screen indicating the location of occurrence of the accident or the incident superimposed on the map on the display unit.

(Supplementary Note 6)

The monitoring system according to Supplementary Note 5, wherein, when the detecting unit determines that the accident or the incident has occurred, the detecting unit performs at least one of identifying a time of occurrence of the accident or the incident, based on the optical signal, and identifying a type of the accident or the incident, based on the information indicating the environmental state, and, when the detecting unit determines that the accident or the incident has occurred, the broadcasting unit performs the broadcasting to the monitor's terminal and displays the screen indicating at least one of the type and the time of occurrence of the accident or the incident further superimposed on the map on the display unit.

(Supplementary Note 7)

A monitoring device comprising:

an acquiring unit configured to acquire information indicating a peripheral environmental state, the information being contained in an optical signal received from an optical fiber configured to sense the environmental state;

a detecting unit configured to detect at least one of an accident and an incident, based on the information indicating the environmental state; and a broadcasting unit configured to broadcast that the accident or the incident has occurred, to a monitor's terminal when the detecting unit determines that the accident or the incident has occurred.

(Supplementary Note 8)

The monitoring device according to Supplementary Note 7, wherein, when the detecting unit determines that the accident or the incident has occurred, the detecting unit identifies a type of the accident or the incident, based on the information indicating the environmental state, and, when the detecting unit determines that the accident or the incident has occurred, the broadcasting unit performs the broadcasting and notifies the type of the accident or the incident, to the monitor's terminal.

(Supplementary Note 9)

The monitoring device according to Supplementary Note 8, wherein, when the detecting unit determines that the accident or the incident has occurred, the broadcasting unit determines the monitor's terminal according to the type of the accident or the incident, performs the broadcasting, and notifies the type of the accident or the incident, to the determined monitor's terminal.

(Supplementary Note 10)

The monitoring device according to any one of Supplementary Notes 7 to 9, wherein, when the detecting unit determines that the accident or the incident has occurred, the detecting unit performs at least one of identifying a time of occurrence of the accident or the incident and identifying a location of occurrence of the accident or the incident, based on the optical signal, and, when the detecting unit determines that the accident or the incident has occurred, the broadcasting unit performs the broadcasting and notifies at least one of the location of occurrence and the time of occurrence of the accident or the incident, to the monitor's terminal.

(Supplementary Note 11)

The monitoring device according to Supplementary Note 7, wherein, when the detecting unit determines that the accident or the incident has occurred, the detecting unit identifies a location of occurrence of the accident or the incident, based on the optical signal, and, when the detecting unit determines that the accident or the incident has occurred, the broadcasting unit performs the broadcasting to the monitor's terminal and displays a screen indicating the location of occurrence of the accident or the incident superimposed on the map, on a display unit of the monitor's terminal.

(Supplementary Note 12)

The monitoring device according to Supplementary Note 11, wherein,
when the detecting unit determines that the accident or the incident has occurred, the detecting unit performs at least one of identifying a time of occurrence of the accident or the incident, based on the optical signal, and identifying a type of the accident or the incident, based on the information indicating the environmental state, and,
when the detecting unit determines that the accident or the incident has occurred, the broadcasting unit performs the broadcasting to the monitor's terminal and displays the screen indicating at least one of the type and the time of occurrence of the accident or the incident further superimposed on the map, on the display unit.

(Supplementary Note 13)

A monitoring method comprising, by a monitoring system:
a receiving step of receiving an optical signal from an optical fiber configured to sense a peripheral environmental state, the optical signal containing information indicating the environmental state;
a detecting step of detecting at least one of an accident and an incident, based on the information indicating the environmental state, the information being contained in the optical signal; and
a broadcasting step of broadcasting that the accident or the incident has occurred, to a monitor's terminal, when it is determined that the accident or the incident has occurred in the detecting step.

(Supplementary Note 14)

The monitoring method according to Supplementary Note 13, wherein
the detecting step includes identifying a type of the accident or the incident, based on the information indicating the environmental state, when it is determined that the accident or the incident has occurred, and
the broadcasting step includes performing the broadcasting and notifying the type of the accident or the incident, to the monitor's terminal, when it is determined that the accident or the incident has occurred in the detecting step.

(Supplementary Note 15)

The monitoring method according to Supplementary Note 14, wherein the broadcasting step includes determining the monitor's terminal according to the type of the accident or the incident, performing the broadcasting, and notifying the type of the accident or the incident, to the determined monitor's terminal, when it is determined that the accident or the incident has occurred in the detecting step.

(Supplementary Note 16)

The monitoring method according to any one of Supplementary Notes 13 to 15, wherein
the detecting step includes performing at least one of identifying a time of occurrence of the accident or the incident and identifying a location of occurrence of the accident or the incident, based on the optical signal, when it is determined that the accident or the incident has occurred, and the broadcasting step includes performing the broadcasting and notifying at least one of the location of occurrence and the time of occurrence of the accident or the incident, to the monitor's terminal, when it is determined that the accident or the incident has occurred in the detecting step.

(Supplementary Note 17)

The monitoring method according to Supplementary Note 13, wherein
the detecting step includes identifying a location of occurrence of the accident or the incident, based on the optical signal, when it is determined that the accident or the incident has occurred, and
the broadcasting step includes performing the broadcasting to the monitor's terminal and displaying a screen indicating the location of occurrence of the accident or the incident superimposed on a map, on a display unit of the monitor's terminal, when it is determined that the accident or the incident has occurred in the detecting step.

(Supplementary Note 18)

The monitoring method according to Supplementary Note 17, wherein
the detecting step includes performing at least one of identifying a time of occurrence of the accident or the incident, based on the optical signal, and identifying a type of the accident or the incident, based on the information indicating the environmental state, when it is determined that the accident or the incident has occurred, and
the broadcasting step includes performing the broadcasting to the monitor's terminal and displaying the screen indicating at least one of the type and the time of occurrence of the accident or the incident further superimposed on the map, on the display unit, when it is determined that the accident or the incident has occurred in the detecting step.

REFERENCE SIGNS LIST

10 OPTICAL FIBER
20 RECEIVING UNIT
30 MONITORING DEVICE
31 ACQUIRING UNIT
32 DETECTING UNIT
33 BROADCASTING UNIT
40 MONITOR'S TERMINAL
41 DISPLAY UNIT
50 POLE
60 COMPUTER
601 PROCESSOR
602 MEMORY
603 STORAGE
604 INPUT/OUTPUT INTERFACE
6041 DISPLAY DEVICE
6042 INPUT DEVICE
6043 SOUND OUTPUT DEVICE
605 COMMUNICATION INTERFACE
S1 to S3 SENSING POINT
P12, P23 WIRE

What is claimed is:

1. A monitoring system comprising:
a receiving unit configured to receive, from an optical fiber, an optical signal containing information indicating an environmental state;
a detecting unit configured to detect at least one of an accident or an incident and a location of the accident or the incident based on the information indicating the environmental state; and
a broadcasting unit configured to, in response to the detecting unit detecting the accident or the incident:

broadcast that the accident or the incident has occurred to an external terminal; and notify the external terminal of the location of the accident or the incident.

2. The monitoring system of claim 1, wherein the receiving unit is configured to connect to the optical fiber.

3. The monitoring system of claim 1, wherein the broadcasting unit is configured to, if the detecting unit determines that the accident or the incident has occurred, determine the external terminal according to the type of the accident or the incident, perform the broadcasting, and notify the type of the accident or the incident, to the determined external terminal.

4. The monitoring system of claim 1, wherein the detecting unit is configured to, if the detecting unit determines that the accident or the incident has occurred, perform at least one of identifying a time of occurrence of the accident or the incident and identifying a location of occurrence of the accident or the incident, based on the optical signal, and wherein the broadcasting unit is configured to, if the detecting unit determines that the accident or the incident has occurred, perform the broadcasting and notify at least one of the location of occurrence and the time of occurrence of the accident or the incident, to the external terminal.

5. The monitoring system of claim 1, wherein the broadcasting unit is configured to, if the detecting unit determines that the accident or the incident has occurred, perform the broadcasting to the external terminal and display a screen indicating the location of occurrence of the accident or the incident superimposed on the map on a display unit.

6. The monitoring system of claim 5, wherein the detecting unit is configured to, if the detecting unit determines that the accident or the incident has occurred, perform at least one of identifying a time of occurrence of the accident or the incident, based on the optical signal, and identifying a type of the accident or the incident, based on the information indicating the environmental state, and wherein the broadcasting unit is configured to, if the detecting unit determines that the accident or the incident has occurred, perform the broadcasting to the external terminal and display the screen indicating at least one of the type and the time of occurrence of the accident or the incident further superimposed on the map on the display unit.

7. A monitoring device comprising:

an acquiring unit configured to acquire information indicating an environmental state in a periphery of an optical fiber based on an optical signal;

a detecting unit configured to detect at least one of an accident or an incident and a location of the accident or the incident based on the information indicating the environmental state; and a broadcasting unit configured to, in response to the detecting unit detecting the accident or the incident:

broadcast that the accident or the incident has occurred to an external terminal; and notify the external terminal of the location of the accident or the incident.

8. The monitoring device of claim 7, wherein the receiving unit is configured to connect to the optical fiber.

9. The monitoring device of claim 7 wherein the broadcasting unit is configured to, if the detecting unit determines that the accident or the incident has occurred, determine the external terminal according to the type of the accident or the incident, perform the broadcasting, and notify the type of the accident or the incident, to the determined external terminal.

10. The monitoring system of claim 7, wherein the detecting unit is configured to, if the detecting unit determines that the accident or the incident has occurred, perform at least one of identifying a time of occurrence of the accident or the incident and identifying a location of occurrence of the accident or the incident, based on the optical signal, and wherein the broadcasting unit is configured to, if the detecting unit determines that the accident or the incident has occurred, perform the broadcasting and notify at least one of the location of occurrence and the time of occurrence of the accident or the incident, to the external terminal.

11. The monitoring system of claim 7, wherein the broadcasting unit is configured to, if the detecting unit determines that the accident or the incident has occurred, perform the broadcasting to the external terminal and display a screen indicating the location of occurrence of the accident or the incident superimposed on the map on a display unit.

12. The monitoring system of claim 11, wherein the detecting unit is configured to, if the detecting unit determines that the accident or the incident has occurred, perform at least one of identifying a time of occurrence of the accident or the incident, based on the optical signal, and identifying a type of the accident or the incident, based on the information indicating the environmental state, and wherein the broadcasting unit is configured to, if the detecting unit determines that the accident or the incident has occurred, perform the broadcasting to the external terminal and display the screen indicating at least one of the type and the time of occurrence of the accident or the incident further superimposed on the map on the display unit.

13. A monitoring method comprising:

acquiring, using an acquiring unit, information indicating an environmental state in a periphery of an optical fiber based on an optical signal;

detecting, using a detecting unit, at least one of an accident or an incident and a location of the accident or the incident based on the information indicating the environmental state; and in response to detecting the accident or the incident:

broadcasting, using a broadcasting unit, that the accident or the incident has occurred to an external terminal; and notifying, using the broadcasting unit, the external terminal of the location of the accident or the incident.

14. The monitoring method according to claim 13, wherein the detecting includes performing at least one of identifying a time of occurrence of the accident or the incident, based on the optical signal, and identifying a type of the accident or the incident, based on the information indicating the environmental state, if it is determined that the accident or the incident has occurred, and wherein the broadcasting includes performing the broadcasting to the external terminal and displaying the screen indicating at least one of the type and the time of occurrence of the accident or the incident further superimposed on the map, on a display unit, if it is determined that the accident or the incident has occurred in the detecting.

* * * * *